March 25, 1941.  G. G. NEIDICH  2,236,442
DUPLICATING MACHINE
Filed July 29, 1939   6 Sheets-Sheet 1

Inventor
George G. Neidich
by his Attorneys
Howson & Howson

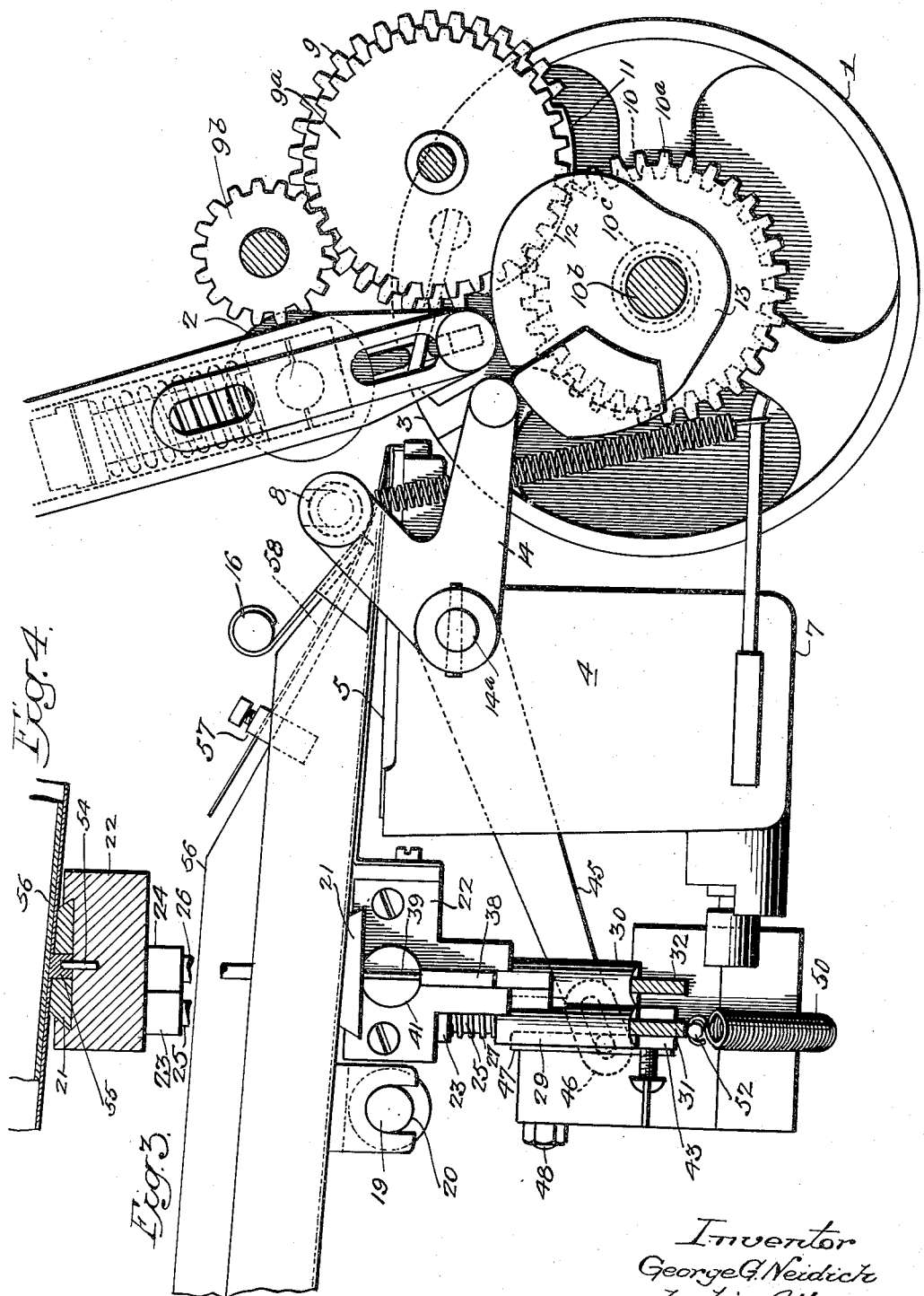

March 25, 1941.  G. G. NEIDICH  2,236,442
DUPLICATING MACHINE
Filed July 29, 1939  6 Sheets-Sheet 3
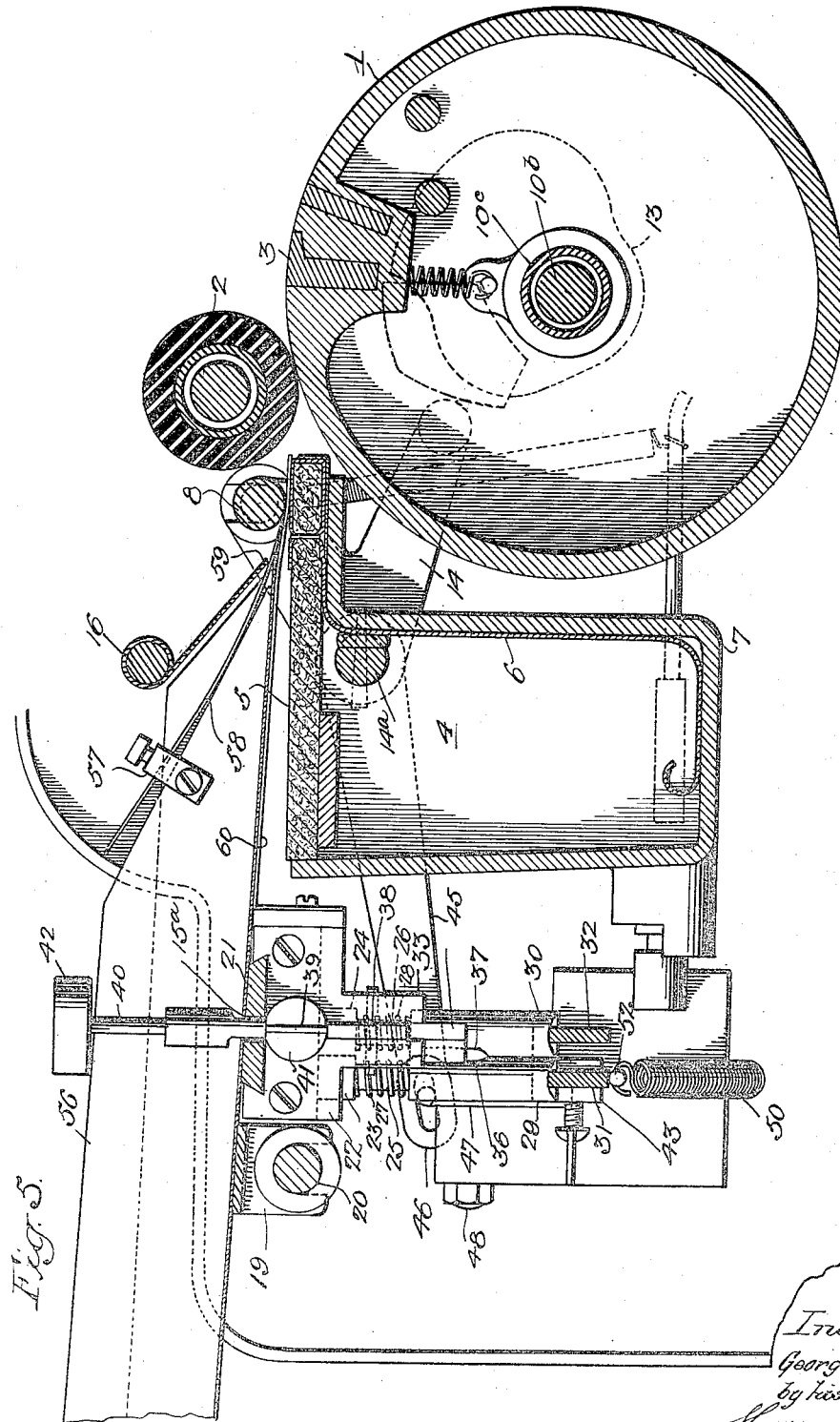

March 25, 1941.	G. G. NEIDICH	2,236,442
DUPLICATING MACHINE
Filed July 29, 1939	6 Sheets-Sheet 4
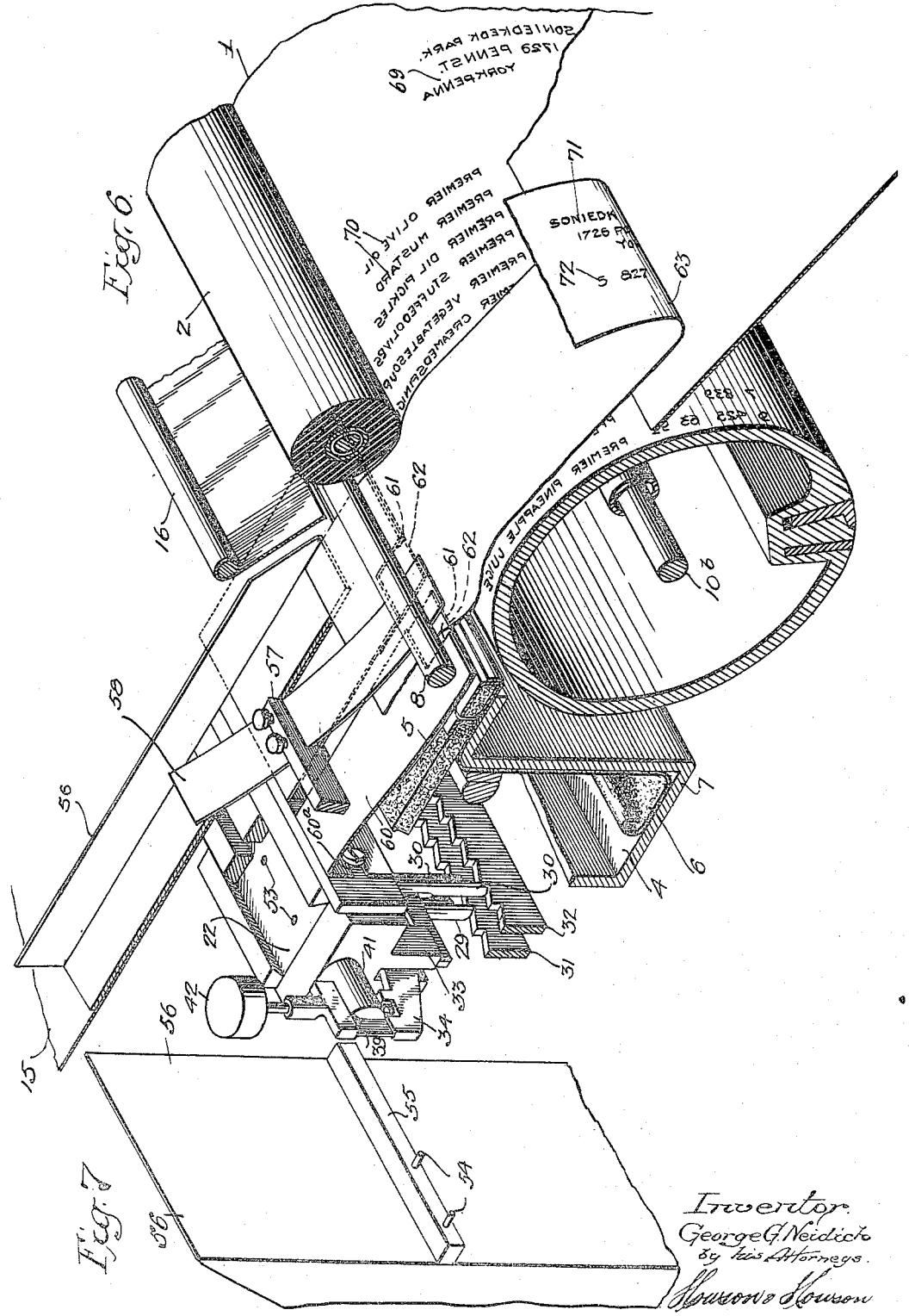

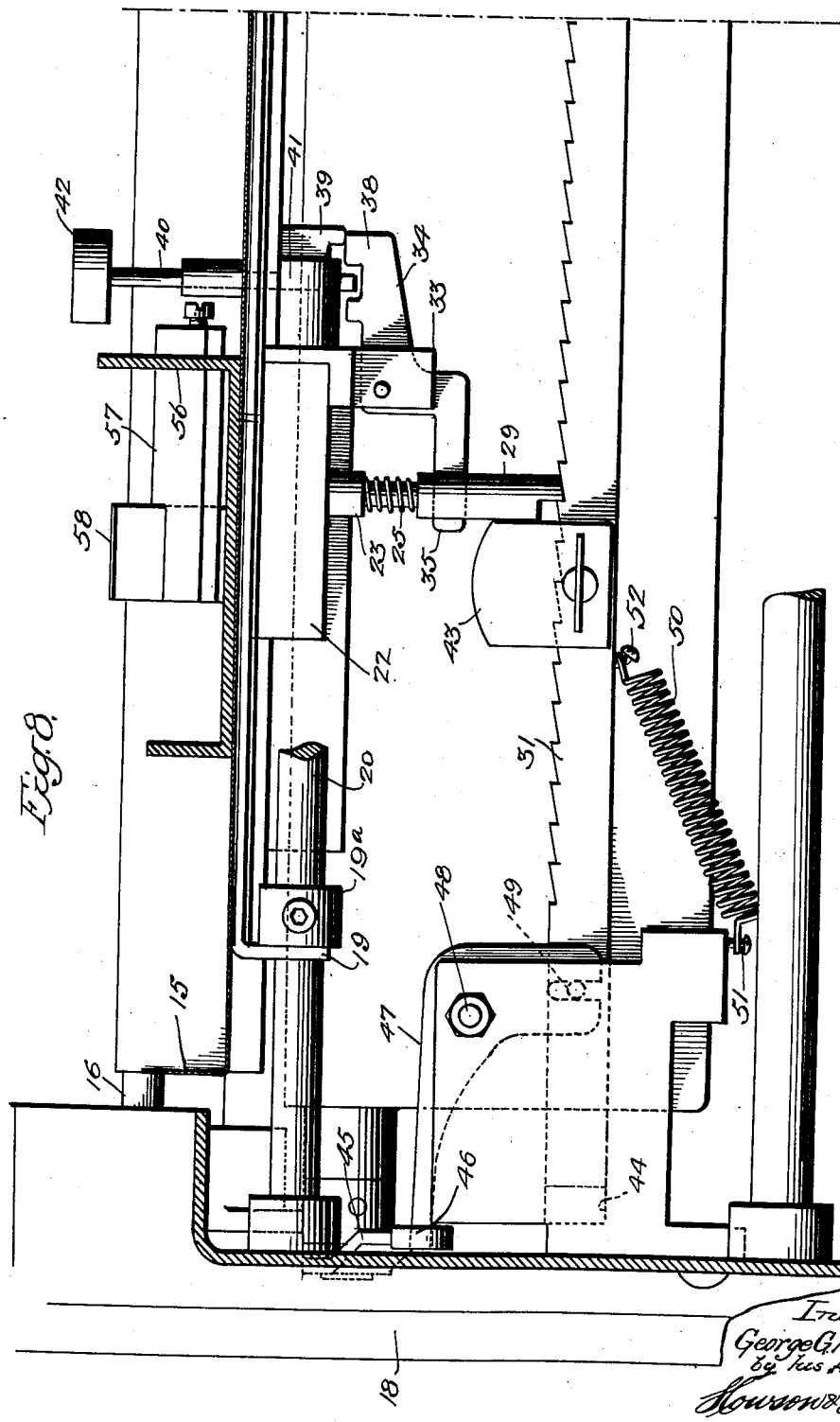

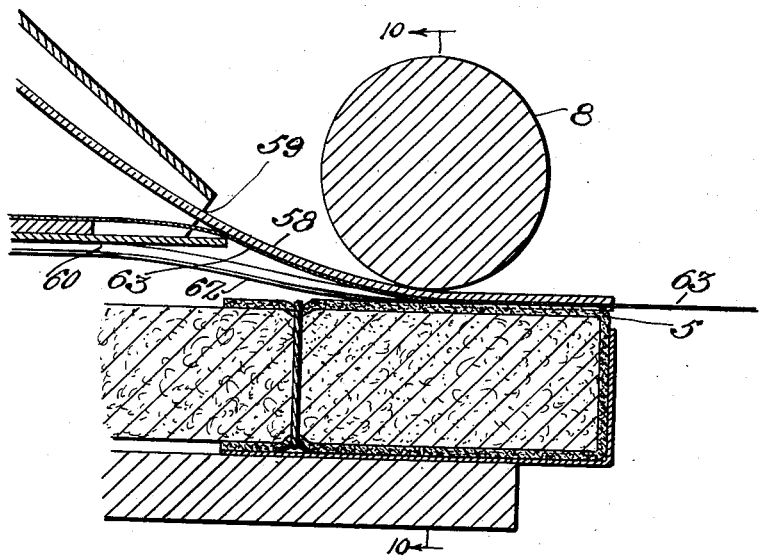
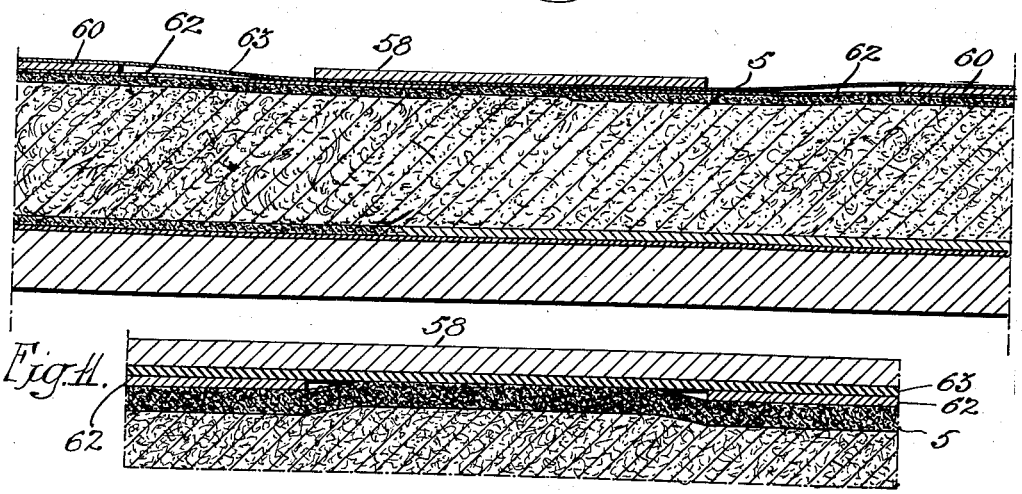

Patented Mar. 25, 1941

2,236,442

UNITED STATES PATENT OFFICE 2,236,442

DUPLICATING MACHINE

George G. Neidich, New York, N. Y.

Application July 29, 1939, Serial No. 287,379

16 Claims. (Cl. 101—132.5)

This invention relates to improvements in duplicating machines in which successive copies are prepared by bringing moistened copy sheets into engagement with a master sheet on which there has been produced matter to be transferred to the copy sheets. As is now well understood in the art, the said matter is produced on the master sheet by means of a substance which is soluble in a fluid with which the copy sheets are moistened.

By the present invention, there is provided an improved duplicating device by means of which the operator may make copies of the entire master sheet, or copies of the constituent sections or lines of the master sheet. More particularly, such apparatus is adapted not only for duplication of the master sheet as a whole, but also for duplication, or repeated duplication, of a particular portion, or section, of the master sheet, and also for duplication of successive sections, or lines, of the master sheet as the operator simply feeds the copy sheets to the machine.

There are many specific uses to which a machine of this character may be applied. For example, such a machine facilitates bookkeeping in many instances by reason of its being adapted to select the successive items from invoices and the like. While there have been proposed heretofore machines capable of duplicating the constituent portions, or line sections, of a master sheet, the machine provided by the present invention constitutes an improvement over prior devices of the same general class by virtue of certain features which will be pointed out in detail hereinafter.

The principal object of the invention, therefore, is to provide a novel duplicating machine capable of duplicating any part or all of a master sheet, and further capable of duplicating successive lines, or sections, of the master sheet in automatic sequence.

A more specific object of the invention is to provide a duplicating machine of the general type disclosed in my copending application, Serial No. 129,275, filed March 5, 1937, that is, one having an intermittently operable master roll, wherein there is provided, according to this invention, a device for controlling the duplicating process which is automatically adjustable during the quiescent state of the master roll to cause duplication of successive sections, or lines, of the master sheet. While it is preferred to employ a machine having an intermittently operable master roll, the invention is not limited to such a machine.

Other objects and features of the invention will be apparent as the description proceeds.

In the accompanying drawings:

Fig. 3 is a detailed sectional view of the principal portion of the machine with which the invention is concerned;

Fig. 4 is a fragmentary sectional view showing more clearly the mounting of the adjustable moisture-limiting device;

Fig. 5 is a sectional view showing more clearly the cooperative association of the moisture-limiting device with the moistening means;

Fig. 6 is a perspective view illustrating the principal parts of the machine to better advantage, with certain parts being broken away for clarity of illustration;

Fig. 7 is a fragmentary perspective view of the tray forming part of the moisture-limiting device;

Fig. 8 is a partial section taken near the rear of the machine and looking forwardly thereof;

Fig. 9 is a greatly enlarged detailed section of the moisture-limiting parts;

Fig. 10 is a greately enlarged section taken along line 10—10 of Fig. 9 but omitting the pressure bar; and Fig. 11 is a further enlarged section illustrating the action of the moisture-limiting parts.

Figure 1:
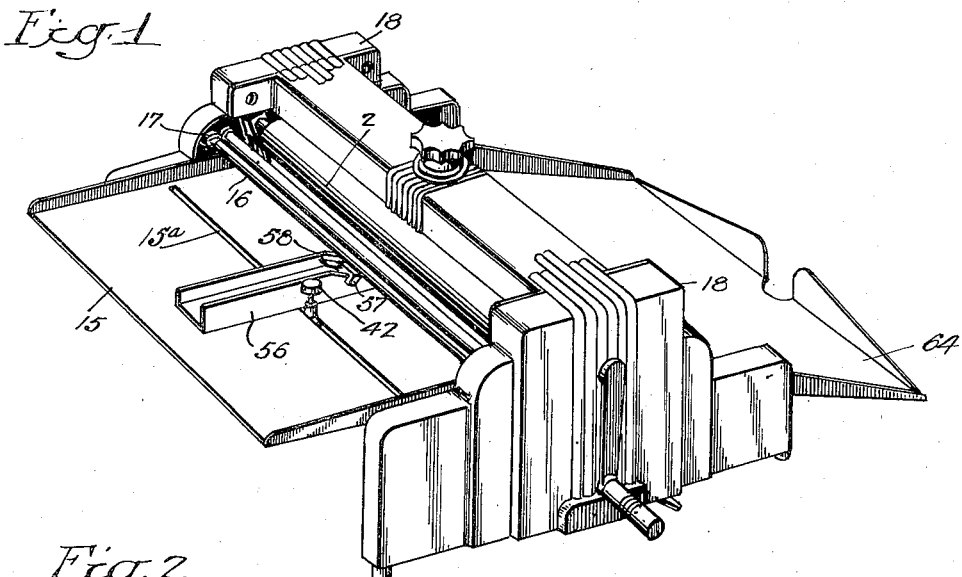
Figure 1 is a perspective view of the duplicating machine.

Referring to Fig. 1, there is shown a machine embodying the invention which is operable by means of a crank handle at the right side as viewed from the rear of the machine. As in prior devices of this general type, the master sheet is carried by a master roll and the copy sheets are fed from the rear of the machine by means of a supporting tray, and at the same time the crank handle is operated, the copy sheets being discharged into a tray at the front of the machine. Of course, such a machine may be power-driven by means of a motor or the like.

Figure 2:
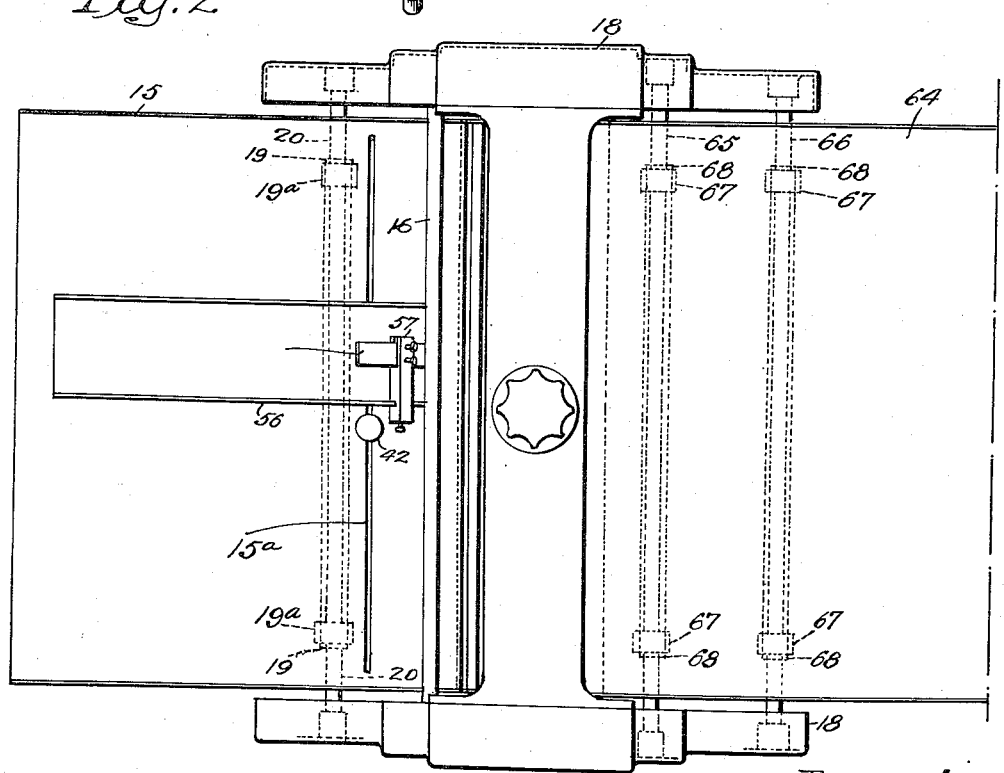
Fig. 2 is a plan view illustrating particularly the alignment of certain parts.

Fig. 2 shows the alignment of the front and rear trays, as will be discussed hereinafter.

Referring now particularly to Figs. 3 and 5, there is shown the rotatable master roll 1 and the associated pressure roll 2. The master roll 1 is adapted to carry a master sheet which is removably held by means of the clamp 3. A moistening device, shown generally at 4, serves to moisten the successive copy sheets prior to the passage thereof between the master roll 1 and the pressure roll 2. As well understood, the passage of the moistened copy sheets between the two rolls causes the material on the master sheet to be transferred to the copy sheets.

The moistening device 4 comprises a strip or sheet of absorbent material 5 extending transversely of the machine substantially the length of the pressure roll 1. Moistening fluid is supplied to the moistening member 5 by means of capillary wicks 6, the upper ends of which are in contact with the moistening member while the lower ends of the wicks are disposed within a reservoir 7 containing the moistening fluid. The copy sheets are passed between the forward portion of the moistening member and a pressure bar 8, thus moistening the said sheets just prior to their passage between the rolls 1 and 2. Of course, the parts could be arranged to moisten the top side of the copy sheet, in which case the master roll would be placed above the pressure roll 2.

Preferably, the machine is of the general character disclosed in the above-mentioned copending application, there being provided means for intermittently operating the master roll 1 and for raising the pressure bar 8 during the quiescent state of the master roll to permit free feeding of a copy sheet. As shown in Fig. 3, the intermittent operation of the master roll may be effected by means of gears 9 and 10, each having teeth over a major portion of its periphery, and the two gears having complementary arcuate surfaces 11 and 12 by means of which the rotation of the master roll is interrupted during a predetermined part of each operating cycle. Gear 9 is mounted together with gear 9a on a common shaft, and is driven by gear 9b which meshes with gear 9a. A driven gear 10a is mounted on shaft 10b and meshes with gear 9a. The roll or drum 1 is mounted on a hollow shaft 10c which is rotatable on shaft 10b. Gear 10 is also carried by the hollow shaft 10c. During the greater part of the operating cycle, the driving gear 9 for drum 1 meshes with the driven gear 10, thus rotating the master roll, but at a predetermined point in the operating cycle, the arcuate surface 12 comes into engagement with the complemental surface 11, and gear 10 stops and remains stationary while the surface 12 rides over the surface 11 of the rotating gear 9. Immediately following the cessation of rotation of the master roll, the cams 13 on shaft 10b actuate the bell-crank levers 14 carrying the pressure bar 8. Consequently, the pressure bar 8 is raised to permit the free insertion of a copy sheet.

The device thus far described is disclosed and described in detail in the above-mentioned copending application. Only such portions of the prior device as are related to the present invention and are necessary for a clear understanding thereof are illustrated herein.

In accordance with the present invention, the machine is made of considerable width for reasons which will be explained later. At the rear of the machine, there is provided a removable tray 15 extending substantially the entire width of the machine and carrying a transverse rod 16 whose ends are removably insertable in bearings 17 on the frame 18 (see Figs. 1 and 8), and carrying also recessed brackets 19 adapted to seat on a transverse rod 20 also carried by the frame. A slotted rail 21 (see Figs. 3 to 5), is attached to the underside of tray 15 and extends transversely thereof in alignment with a slot 15a in the tray. This rail serves as a support and guide for a transversely movable device which is adapted to limit the moistening of a copy sheet in the manner to be described presently.

The said device comprises a block 22 slidably carried by rail 21 and carrying a pair of depending sleeves 23 and 24 in which there are slidably seated rods or plungers 25 and 26 having associated springs 27 and 28 urging the rods or plungers downward. Thus, the two plungers are resiliently seated in their respective sleeve retainers. The lower ends of these plungers are formed to provide pawls 29 and 30 (see Fig. 6), which are adapted to function cooperatively with associated racks 31 and 32 in a manner to be described. It will be noted that the springs 27 and 28 urge the pawls into engagement with the associated racks.

The block 22 is formed to provide extensions 33 (see Fig. 8), which pivotally carry a lever 34, one end 35 of which is disposed in cooperative recesses 36 and 37 (see Fig. 5), of the two plungers. The opposite end 38 of lever 34 is constructed and arranged cooperatively with an actuating member 39 on a reciprocably movable rod 40 carried by an extending cylindrical portion 41 of block 22 and having a manually depressible button or knob 42. By depressing the knob 42, the pawls 29 and 30 may be raised out of engagement with the racks 31 and 32 through the action of lever 34, thus permitting manual movement of the adjustable device transversely of the machine, and also allowing repeated operation of the machine without transverse motion of the adjustable device, in order to permit re-duplication of the same material, as will be more clearly understood later. An adjustable stop 43 (see Fig. 8), is mounted upon rack 31 and serves to limit the movement of the adjustable device in one direction. The purpose of this will be described later.

The rack 32 is stationary and is so held by the frame of the machine, while the rack 31 is mounted for reciprocal movement in the supporting portions 44 of the frame. Attached to the shaft 14a of the bell-crank lever 14 at the left-hand side of the machine, as viewed from the rear thereof, is an extended arm 45 (see Figs. 3 and 8), with a slotted end 46 engaged by one arm of a bell-crank lever 47 which is pivotally supported by the frame at 48. The other arm of the bell-crank lever 47 is slotted to receive a pin 49 on the movable rack 31. This rack is urged toward the left, as viewed from the rear of the machine by a spring 50, one end of which is anchored at 51, while the other end is attached to the movable rack at 52.

The block 22 has recesses or openings 53 (see Fig. 6), to receive pins 54 (Fig. 7), depending from a guide bar 55 disposed within the aligned slots of the tray 15 and the rail 21. The guide bar 55 is secured to an auxiliary tray 56 which is thus carried transversely of the machine by the movable block 22. A bracket 57 (see Figs. 3, 5 and 8), is removably attached to a wall of the tray 56 near the forward end thereof and carries a resilient metal strip 58 which extends through the mouth 59 at the forward end of tray 15 under the pressure bar 8. At the forward side of the block 22, there are attached a pair of spaced resilient sheet members 60 which are adjustable relative to one another by the slot and screw attachments 60a (see Fig. 6), and whose adjacent edges are spaced apart a predetermined distance, determined by the adjustment. These strips are cut away at their forward inner portions, as shown at 61, and have secured thereto very thin resilient sheet pieces 62. The forward ends of the two sheet members 60 are disposed above the moistening member 5, and the narrow resilient strip 58 extends above the space between the said ends. During the duplication of a line, or section, of the master sheet, the copy sheet 63 is fed between the resilient strip 58 and the members 60, and the copy sheet comes into contact with the moistening member 5 only throughout a narrow portion of the copy sheet extending in the direction of travel thereof. The cooperative action of the bar 8, strip 58, and the shield or screen comprising elements 60 and 62, is depicted in Figs. 9 to 11. The shield pieces 62 are extremely thin and may be only a few thousandths of an inch thick, and these pieces are imbedded slightly in the moistening pad by the applied pressure, as shown in Figs. 10 and 11, so that the portion of the copy sheet 63 between the shield pieces 62 is enabled to contact the moistening pad. Thus, the copy sheet is conditioned to receive only a relatively narrow section or line of the printed material on the master sheet.

In preparing the machine for use, the discharge tray 64 (see Fig. 2), is placed in position upon the supporting rods 65 and 66 carried by the frame 18. This tray is supported on the rods by means of recessed brackets 67 carried by the tray which cooperate with collars 68 on the rods to fix the position of the tray. Following the proper positioning of this tray, the master sheet is aligned with one side of the tray and is attached to the master roll by operating the machine until the master clamp 3 opens, inserting the edge of the master sheet beneath the clamp, and then rotating the machine to close the clamp, as set forth specifically in the above-mentioned copending application. With the master sheet attached to the master roll in aligned relation with the discharge tray 64, the tray 15 is aligned with the tray 64 and is fixed in position by means of the recessed brackets 19 associated with adjustable collars 19a on rod 20.

Considering now the operation of the device as a whole, when it is desired to duplicate an entire master sheet which is generally considerably shorter in length than the length of the master roll 1, the adjustable moisture-limiting device may be moved to one side of the machine simply by depressing the knob 42 and shifting the said device to one side. The master sheet may be attached to the side of the master roll opposite that at which the adjustable moistener control device is disposed. The machine may then be operated in the usual manner to duplicate the entire master sheet on successive copy sheets which are fed from the tray 15. If desired, the pressure bar 8 may be of slightly smaller diameter at the side where the moisture-limiting device is inoperatively positioned, to accommodate the shield elements and to obtain more uniform pressure on the copy sheet throughout the width of the master sheet.

When it is desired to duplicate the successive lines of the master sheet, the adjustable moisture-limiting device may be moved to a position determined by the stop 43. This adjustable stop functions to locate the moistener control device in proper relation to the first line, or portion, of the master sheet to be duplicated. In the case of an invoice, for example, there will generally be a heading below which there appear the successive invoice items. Accordingly, in order to duplicate the successive invoice items individually, the stop 43 may be located so as to align the moistener control device with the first item to be duplicated.

Following the duplication of the first line, the master roll 1 will be automatically stopped, as above described, and the pressure bar 8 will be raised. The movement of the arm 45 at this time actuates the bell-crank lever 47 to shift the rack 31 toward the right as viewed from the rear of the machine. Through the engagement of this rack with pawl 29, the moisture-limiting device is moved through one step, the pawl 30 riding over one tooth of the stationary rack 32. When the pressure bar 8 is lowered, thus returning arm 45 and bell-crank lever 47 to their normal positions, the spring 50 returns the rack 31 to its normal position, but the moistener control device is retained in the position to which it has been moved by virtue of the engagement of pawl 30 with rack 32, the latter acting as a detent. It will be noted that the rack 31 is permitted to return to its normal position, since the resiliently mounted pawl 29 simply rides over one of the rack teeth. In the meantime, the copy sheet on which the second item or line of the master sheet is to be duplicated will have been inserted from tray 56 beneath the pressure bar 8, the tray 56 serving as a guide to locate the copy sheet in proper position. During the operating portion of the cycle, the second item or line of the master sheet will be duplicated.

The above-described operation is repeated during each cycle of operation, the rack mechanism functioning to shift the moistener control device step-by-step, thus conditioning the machine for duplication of the successive lines of the master sheet in automatic sequence.

Instead of duplicating successive lines of the master sheet, the same line or section may be repeatedly duplicated by holding knob 42 in depressed position, which renders the stepping mechanism ineffective by virtue of the disengagement of the pawls from the racks. In fact, it is only necessary to depress knob 42 just prior to the quiescent part of each operating cycle, to prevent stepping.

Attention is now directed to certain important features of the apparatus. Referring again to the rack and pawl mechanism, by which the moisture-limiting device is moved step-by-step, the stationary rack 32 is accurately constructed so that its teeth are spaced apart an exact predetermined distance, preferably an amount equal to a multiple of a standard typewriter space. This rack serves to accurately position the moisture-limiting device after each stepping movement. The actuating rack 31 may advance the device through varying amounts ranging from one tooth space of rack 32 to almost two tooth spaces, but the device will always be positioned exactly one space. For example, if the rack 31 moves the device through one and one-half tooth spaces of rack 32, the return movement of rack 31 will cause slight backward movement of the device until pawl 30 engages the effective tooth of rack 32.

Thus, the accurate positioning of the device is made possible by the use of an accurately constructed stationary rack as the positioning means. The high degree of accuracy thus obtained is very important, for any slight error in the step-by-step movement would be accumulative and would throw the moistened portion of the copy sheet out of alignment with the line of the master sheet to be copied.

Another important feature of the apparatus resides in the fact that the line or section of the master sheet being copied is exactly positioned on the copy sheet, and the reproduced line appears in the same position on each successive copy sheet. This obtains by virtue of the fact that the side walls of tray 56 position each copy sheet in exact relation to the screen or mask elements 61, 62, so that each copy sheet is moistened along a section bearing a fixed relation to the edges of the copy sheet, and the accurate stepping mechanism positions tray 56 in exact relation to the successive lines of the master sheet.

It is important to note that the adjustability of members 60 not only permits variation of the width of the line being printed, but also permits positioning of the copied line on the copy sheet by adjusting both of the members 60 relative to the sides of tray 56.

A further important feature of the apparatus resides in its adaptability to reproduce, upon successive copy strips, the heading of an invoice or the like, and a single line of the invoice as may be clearly seen by referring to Fig. 6. In that figure, the master sheet shown on the drum or roll 1 comprises a heading 69 and successive lines 70, the first line being spaced a predetermined distance from the heading. By using copy strips of predetermined width, such that the heading alone may be transferred to the copy sheets, leaving thereon sufficient space for later reproduction of a line, the copy strips may be run through the machine successively in proper relation to the heading 69 and with the moisture control device in an inoperative position. This will reproduce the heading on each copy strip, as shown at 71 in Fig. 6. Thereafter, the moisture-limiting device may be adjusted in proper relation to the first line of the invoice, and the same copy strips may be fed through the machine successively, so that a different line will be produced on each copy strip along with the heading. Such line reproduction is shown at 72 in Fig. 6. Thus, the apparatus is capable of reproducing successive items of an invoice or the like, each item copied having thereon the heading taken from the invoice. Such use of the machine is of great importance where it is desired to file itemized slips or copies in different departments of an organization.

It is important to note that the apparatus of this invention is characterized by the fact that the master sheet when once positioned on the master roll remains stationary, and it is unnecessary to move it in order to obtain reproductions of the entire master sheet, or various sections thereof at will. By the simple manipulation of the moisture control device, the machine may be operated to obtain the various results above set forth.

While a preferred embodiment of the invention has been illustrated and described for the purpose of disclosure, it will be understood that various modifications of the invention are possible, and, therefore, is not to be considered as limited to the specific apparatus illustrated.

I claim:

1. In a duplicating apparatus, a master roll adapted to carry a master sheet from which copies are to be made, stationary moistening means extending lengthwise of said roll and adjacent thereto, a moisture area limiting device adjustably movable relative to said moistening means lengthwise of said roll and said moistening means, and means on said device arranged cooperatively with said moistening means to cause the latter to moisten only a narrow strip of a copy sheet fed to the apparatus, whereby a narrow section only of said master sheet is duplicated on said copy sheet.

2. In a duplicating apparatus, a master roll adapted to carry a master sheet from which copies are to be made, moistening means extending lengthwise of said roll and adjacent thereto, a moisture-limiting device adjustably movable relative to said moistening means lengthwise of said roll and said moistening means, a shield or screen carried by said device and arranged cooperatively with said moistening means to cause the latter to moisten only a narrow strip of a copy sheet fed to the apparatus, whereby a narrow section only of said master sheet is duplicated on said copy sheet, and means for adjusting said shield to vary the width of the section to be duplicated.

3. In a duplicating apparatus, a master roll adapted to carry a master sheet from which copies are to be made, moistening means extending lengthwise of said roll and adjacent thereto, a moisture-limiting device adjustably movable lengthwise of said roll and said moistening means, a two-part shield or screen carried by said device and arranged cooperatively with said moistening means to cause the latter to moisten only a narrow strip of a copy sheet fed to the apparatus, whereby a narrow section only of said master sheet is duplicated on said copy sheet, and means for relatively adjusting the parts of said shield to vary the width of the section to be duplicated.

4. In a duplicating apparatus, a master roll adapted to carry a master sheet from which copies are to be made, moistening means arranged cooperatively with said roll, and means for limiting the moistening of a copy sheet to a limited portion thereof to duplicate only a portion of the master sheet, said last means comprising a shield having thin sheet portions and a space therebetween, and a resilient finger for pressing a portion of the copy sheet adjacent said space into engagement with said moistening means.

5. In a duplicating apparatus, a master roll adapted to carry a master sheet from which copies are to be made, moistening means extending lengthwise of said roll and adjacent thereto, a moisture positioning device adjustably movable lengthwise of said roll and said moistening means, a shield carried by said device and disposed adjacent to said moistening means, said shield being constructed to provide a space exposing a portion or strip only of the copy sheet to contact with the moisture, and a finger or pressure strip carried by said device and extending above said space so as to effect direct contact of the desired portion of the copy sheet with the moistening means through said space, whereby said limited portion only of the copy sheet is moistened to duplicate a limited portion of the master sheet.

6. In a duplicating apparatus, a master roll adapted to carry a master sheet from which copies are to be made, means for operating said roll through successive operating cycles, stationary moistening means arranged cooperatively with said roll, adjustable means for limiting the moistening of a copy sheet to a limited portion thereof, and means for automatically adjusting said last-named means longitudinally of said master roll during each cycle of operation to duplicate successively different portions of the master sheet on successive copy sheets.

7. In a duplicating apparatus, a master roll adapted to carry a master sheet from which copies are to be made, means for operating said roll through successive operating cycles, means for interrupting the operation of said roll for a predetermined period during each cycle, stationary moistening means arranged cooperatively with said roll, adjustable means for limiting the moistening of a copy sheet to a limited portion thereof, and means for automatically adjusting said last-named means longitudinally of said master roll during each quiescent period of the master roll, to thereby duplicate successively different portions of the master sheet on successive copy sheets.

8. In a duplicating apparatus, a master roll adapted to carry a master sheet from which copies are to be made, means for operating said roll through successive operating cycles, means for interrupting the operation of said roll for a predetermined period during each cycle, moistening means arranged cooperatively with said roll, a pressure bar arranged cooperatively with said moistening means, means for raising said pressure bar during each quiescent period of the master roll, adjustable means for limiting the moistening of a copy sheet to a limited portion thereof, and means operable by said bar-raising means for automatically adjusting said last-named means during each quiescent period of the master roll, to thereby duplicate successively different portions of the master sheet on successive copy sheets.

9. In a duplicating apparatus, a master roll adapted to carry a master sheet from which copies are to be made, moistening means arranged cooperatively with the said roll, a moisture area limiting device adjustably movable in relation to said moistening means and said roll, a pair of resiliently mounted pawls carried by said device, a reciprocable rack arranged cooperatively with one of said pawls, means for reciprocating said rack during each operating cycle to thereby advance said moisture positioning device step-by-step, whereby different portions of the master sheet are duplicated in automatic sequence, and a stationary rack arranged cooperatively with other said pawl for limiting the reciprocal rack motion of the moisture limiting device to exact pre-determined successive positions.

10. In a duplicating apparatus, a master roll adapted to carry a master sheet from which copies are to be made, stationary moistening means arranged cooperatively with said roll, limiting means movable relative to said moistening means lengthwise of said roll for causing said moistening means to moisten only a narrow strip of a copy sheet fed to the apparatus, whereby a narrow section only of matter on said master sheet is duplicated on said copy sheet, and means for positioning said limiting means to an inoperative position at one end of said roll, whereby all the reproducible matter on the master sheet may be repeatedly reproduced on successive copy sheets.

11. In a duplicating apparatus, a master roll adapted to carry a master sheet from which copies are to be made, means for operating said roll through successive operating cycles, moistening means arranged cooperatively with said roll, means for limiting the moistening of a copy sheet to a limited portion thereof to duplicate only a portion of the master sheet, said last means comprising shield portions with a space therebetween, means operable by said roll-operating means for adjusting said limiting means during the successive operating cycles, and means for varying the said space to thereby vary the area of the copy sheet to be moistened.

12. In a duplicating apparatus, a master roll adapted to carry a master sheet from which copies are to be made, means for operating said roll through successive operating cycles, moistening means arranged cooperatively with said roll, means for limiting the moistening of a copy sheet to a limited portion thereof to duplicate only a portion of the master sheet, said last means comprising shield portions with a space therebetween, means operable by said roll-operating means for adjusting said limiting means during the successive operating cycles, and means for adjusting said shield portions so as to vary the position or the width of said space, to thereby vary the position or the width of the area of the copy sheet to be moistened.

13. In a duplicating apparatus, a master roll adapted to carry a master sheet from which copies are to be made, moistening means arranged cooperatively with the said roll, a moisture area limiting device adjustably movable in relation to said moistening means and said roll, means for advancing said limiting device step-by-step during successive operating cycles, whereby different portions of the master sheet are duplicated in automatic sequence, and means comprising an element carried by said limiting device and a cooperating stationary element for limiting the step-by-step motion of said limiting device to exact predetermined successive positions.

14. In an apparatus for copying all or part of matter on a master sheet of predetermined size, a relatively long master roll adapted to carry said master sheet, said roll having an end portion extending beyond the master sheet disposed thereon, moistening means extending lengthwise of said roll and being of sufficient length to moisten copy sheets large enough to receive all of the matter on said master sheet, a device for limiting the area of a copy sheet to which moisture is applied thereby causing said copy sheet to receive only part of the matter on said master sheet, and means for supporting said device in movable relation to said roll and said moistening means and permitting adjustment of said device throughout the length of said roll, whereby said device may be positioned along said roll in different operative positions or it may be positioned inoperatively adjacent to the extending portion of said roll beyond the master sheet so as to permit copying of the entire master sheet.

15. A machine for copying all or part of matter on a master sheet of predetermined size, comprising a master roll extending transversely of the machine and adapted to carry the master sheet, the width of the machine being substantially greater than is necessary to accommodate the master sheet so that a transverse portion of the machine is unused in the copying process, moistening means extending lengthwise of said roll and being of sufficient length to moisten copy sheets large enough to receive all of the matter on said master sheet, a device for limiting the area of a copy sheet to which moisture is applied thereby causing said copy sheet to receive only part of the matter on said master sheet, and means for supporting said device in movable relation to said roll and said moistening means and permitting adjustment of said device throughout the width of the machine, whereby said device may be positioned along said roll in different operative positions or may be positioned inoperatively at the unused portion of the machine beyond the master sheet so as to permit copying of the entire master sheet.

16. In a duplicating apparatus, a master roll adapted to carry a master sheet from which copies are to be made, moistening means extending lengthwise of said roll and adjacent thereto, a moisture positioning device adjustably movable lengthwise of said roll and said moistening means, a shield carried by said device and disposed adjacent to said moistening means, said shield being constructed to provide a space exposing a portion or strip only of the copy sheet to contact with the moisture, and pressure-exerting means carried by said device and disposed adjacent to said space so as to effect direct contact of the desired portion of the copy sheet with the moistening means through said space, whereby said limited portion only of the copy sheet is moistened to duplicate a limited portion of the master sheet.

GEORGE G. NEIDICH.